(12) United States Patent
Levanon et al.

(10) Patent No.: US 8,249,875 B2
(45) Date of Patent: *Aug. 21, 2012

(54) SYSTEM AND METHOD FOR DETERMINING A PERSONAL SHG PROFILE BY VOICE ANALYSIS

(75) Inventors: Yoram Levanon, Ramat Hasharon (IL); Lan Lossos-Shifrin, Zur Hadasah (IL)

(73) Assignee: Exaudios Technologies, Ramat-Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/072,009

(22) Filed: Mar. 25, 2011

(65) Prior Publication Data

US 2011/0173003 A1    Jul. 14, 2011

Related U.S. Application Data

(63) Continuation of application No. 11/536,530, filed on Sep. 28, 2006, now Pat. No. 7,917,366, which is a continuation-in-part of application No. 09/534,170, filed on Mar. 24, 2000, now abandoned.

(60) Provisional application No. 60/747,603, filed on May 18, 2006.

(51) Int. Cl.
*G10L 11/00* (2006.01)
(52) U.S. Cl. ........................................ 704/270
(58) Field of Classification Search .......... 704/205–206, 704/251, 270
See application file for complete search history.

(56) References Cited

U.S. PATENT DOCUMENTS

| | | | |
|---|---|---|---|
| 6,006,188 A | 12/1999 | Bogdashevsky et al. | |
| 7,917,366 B1 * | 3/2011 | Levanon et al. | 704/270 |
| 2004/0249634 A1 | 12/2004 | Degani et al. | |
| 2005/0014117 A1 | 1/2005 | Stillman | |
| 2005/0119894 A1 | 6/2005 | Cutler et al. | |
| 2006/0229896 A1 | 10/2006 | Rosen et al. | |
| 2007/0073799 A1 | 3/2007 | Adjali et al. | |

OTHER PUBLICATIONS

European Search Report from European Patent Appln. No. 07 86 6601 dated Jun. 22, 2010 (2 pgs).
Sommer, Allison Kaplan "Israeli research chows its the voice—not the eyes—that is the window to the soul", ISRAEL21c Newsletter, Jul. 15, 2005 (3 pgs) http://www.israel21c.org/people/israeli-research-shows-it-s-the-voice-not-the-eyes-that-is-the-window-to-the-soul.

* cited by examiner

*Primary Examiner* — Angela A Armstrong
(74) *Attorney, Agent, or Firm* — Greenberg Traurig, LLP

(57) ABSTRACT

According to one embodiment of the present invention a computerized voice-analysis device for determining an S,H,G profile is provided (as described herein, such an S,H,G profile relates to the strengths (e.g., relative strengths) of three human instinctive drives). Of note, the present invention may be used for one or more of the following: analyzing a previously recorded voice sample; real-time analysis of voice as it is being spoken; combination voice analysis—that is, a combination of: (a) previously recorded and/or real-time voice; and (b) answers to a questionnaire.

25 Claims, 1 Drawing Sheet

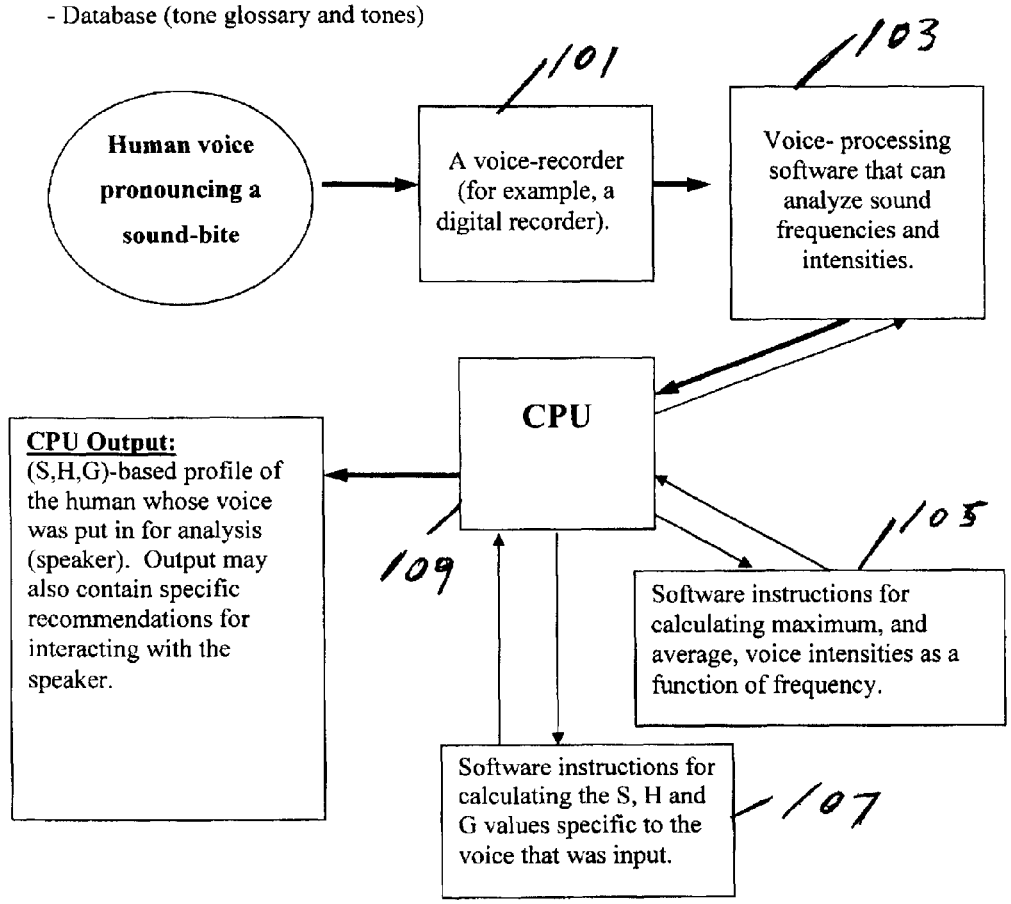

SYSTEM AND METHOD FOR DETERMINING A PERSONAL SHG PROFILE BY VOICE ANALYSIS

RELATED APPLICATIONS

This application is a continuation of Ser. No. 11/536,530, filed Sep. 28, 2006, now U.S. Pat. No. 7,917,366 which is continuation-in-part of U.S. application Ser. No. 09/534,170, filed Mar. 24, 2000, now abandoned. This application also claims the benefit of United States Provisional Application Ser. No. 60/747,603, filed May 18, 2006. Each of the aforementioned applications is incorporated herein by reference in its entirety for all purposes.

FIELD OF THE INVENTION

One embodiment of the present invention relates to a system and method for producing optimum-effect marketing (e.g., marketing that increases sales by improving the effect that the marketing has on potential consumers). More specifically, this embodiment of the present invention relates to a system and method for producing customized and more effective marketing using a business marketing model for producing and selecting advertisements with one or more unique features that will appeal to different consumers. The advertisements may be customized to an inner orientation of a potential consumer. By using such a model, companies can create multiple advertisements for the same product (or service) that produce positive initial responses from consumers having varying inner orientations, and subsequently increase sales of the product (or service).

BACKGROUND OF THE INVENTION

There are many factors which contribute to a successful marketing campaign. To successfully market a product, a producer or distributor (hereinafter referred to as a "company") should ideally have an advantage over its competitors. This advantage may be an improved or unique product (or service). The company should also be able to advertise the product (or service) in a manner that stresses the advantages that the product (or service) provides. Furthermore, a company should decide ahead of time which audience(s) to target, and thus design advertisements to address the specific needs of that group. A company should carry good service relationships with customers. Finally, a marketing campaign of a particular company should reach potential consumers before that of another company.

Even with all these prerequisites, a company often fails to produce successful marketing campaigns. It is believed that this is at least in part because companies conventionally cannot accurately predict how a potential consumer will perceive an advertisement. A company may try to appeal to the sense of adventure in a potential consumer, for example, by portraying specific images or colors in the advertisement. Yet, if the potential consumer is not an "adventurous type", then the efforts on the part of the company have been essentially worthless. A potential consumer might take one quick look at an advertisement and decide, before any further inquiry, that he or she does not wish to purchase the product (or service). Thus, if an advertisement for the product (or service) does not initially appeal to a potential consumer, then typically no sale will be made, regardless of the benefit the consumer might derive from the product (or service), the high quality of the product (or service), or the fact that the advertisement reached the potential consumer before that of another company.

The problem of effective marketing also exists on the Internet. Firstly, Internet "surfers" are typically attracted mostly by the price of a product, while other advantages come secondarily. Furthermore, while in regular marketing, it is possible to direct marketing according to some of the needs of the particular consumer (e.g., based on demographic data, specified interests, etc. . . . it is typically not possible to do this on standard Internet sites (because a business typically cannot know which individuals are visiting their site). Thus, all consumers typically view identical advertisements when they visit the same Web page.

BRIEF DESCRIPTION OF THE DRAWINGS

FIG. 1 shows a block diagram of a system according to one embodiment of the present invention.

Among those benefits and improvements that have been disclosed, other objects and advantages of this invention will become apparent from the following description taken in conjunction with the accompanying FIGURE. The FIGURE constitutes a part of this specification and includes illustrative embodiments of the present invention and illustrates various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

One embodiment of the present invention provides a method for producing optimum-effect marketing (e.g., for use in connection with interactive mediums), comprising: (a) collecting information obtained from potential consumers for generating a computerized database containing personal character profiles of the potential consumers; (b) analyzing and sorting the character profiles into at least three clusters, wherein each cluster corresponds to a subset of character profiles showing a predominant tendency towards one of the following individual orientations: survival, growth, and relaxation, or a combination thereof; (c) producing a series of advertisements for a specific product or service, wherein each advertisement contains one or more unique features so as to be adapted for a specific one of the clusters; and (d) presenting the appropriate advertisement from the series of advertisements to the corresponding cluster of potential consumers.

In one example, the information may be collected via a questionnaire.

In another example, the questionnaire may contain questions relating to the level of disposition of the potential consumer towards survival, growth, and relaxation.

In another example, the questionnaire may be presented to a potential consumer through the Internet, over the telephone, through an interactive television medium, at a point-of-sale, or any other appropriate interactive medium.

In another example, the unique feature(s) of each advertisement may include various colors, sounds, smells, words, and/or images.

In another example, the advertisement may be presented to the potential consumer via electronic mail, direct mail, telephone, interactive television, at a point-of-sale, Internet or any other appropriate interactive medium.

In another example, the number of clusters may be between three and twenty-seven.

In another example, twenty-seven clusters may correspond to all of the possible combinations of low, medium, and high level of orientation towards survival, growth, and relaxation.

Another embodiment of the present invention provides a method for conducting a matching service between at least two people (e.g., for use in connection with dating services, employment agencies, and "chat rooms"), comprising: (a) collecting information obtained from users for generating a computerized database containing personal character profiles of the users; (b) analyzing and sorting the character profiles into at least three clusters, wherein each cluster corresponds to a subset of character profiles showing a predominant tendency towards one of the following individual orientations: survival, growth, and relaxation, or a combination thereof; and (c) matching users according to the cluster of character profiles to which they are categorized.

Referring now more particularly to certain aspects of the present invention, it is believed that when an individual is exposed to a new advertisement, the first immediate response to the advertisement is essentially completely emotionally-based. This is because the center in charge of the immediate reactions in the human brain is the limbic system (located above the brain stem). The limbic system receives the information from the sense organs and produces an immediate response before the "thinking" parts of the brain (the neocortex) have processed the information received. The thinking parts of the brain, after a few seconds, produce a response that rationalizes and justifies the initial emotional response of the individual. In some cases, a second rational response may occur that causes the individual to change their first rational response (usually, however, this does not occur). Therefore, an individual's rational reaction to a new advertisement will typically tend to support the initial emotional response. What this means to companies marketing products or services is that the immediate emotional response should be a positive one (it is believed that the more positive the initial response, the more likelihood that the potential consumer will later make the decision to buy the product or service). Considering the flood of marketing messages that an individual encounters every day, whether on billboards, radio and television commercials, in stores, or on the Internet, the immediate emotional response is typically of crucial importance if advertisers are to sell their products or services (if an initial response is positive, then there is reasonable grounds for an individual to learn more about a product or service; however, if the advertisement did not appeal in the initial stage to the consumer, than even if the product or service would be suitable to meet the needs of the consumer, the consumer will typically not consider purchasing the product or service).

In this regard, under various embodiments of the present invention potential consumers may be categorized according to the following three basic character dispositions for the purposes of marketing: a) survival b) growth, and c) relaxation. A character profile for each potential consumer can be generated based on his or her character disposition, and a database, containing the character profiles, can be produced. Thereafter, the character profiles may arranged into at least three clusters according to the three character dispositions, and customized advertisements may be produced and presented to potential consumers according to the cluster to which they belong.

In one example there may be three clusters corresponding to individuals who are primarily survival, growth, and relaxation-oriented. In another example, there may be six clusters, each corresponding to a different primary character disposition but also corresponding to a secondary disposition of an individual (thus, under this example, a person who is primarily growth-oriented but also exhibits some features of a relaxation-oriented individual will be put into a different cluster than that of a person who is also primarily growth-oriented, but who has a secondary tendency towards the survival orientation). In another example, there may be twenty-seven clusters, produced by evaluating individual character profiles in terms of the relative degree (low, medium, or high) of each character disposition that is exhibited (thus, in this example, an individual may exhibit a high level of relaxation orientation, a medium level of growth orientation, and a low level of survival orientation—another individual might exhibit low levels of both relaxation and survival orientation, but have a high level of growth orientation). In another example, more than three different degrees of each orientation may be designated, for example, extremely high, moderately high, medium, moderately low, and extremely low (this would enable the production a larger number of clusters). Thus, while the present invention is described primarily with reference to three clusters, corresponding to the three primary character orientations, it should be appreciated that any other number of clusters (corresponding to unique combinations of the three main character dispositions) can be produced according to the criterion used.

As mentioned above, it is believed that the particular character disposition of the individual is what primarily determines the initial emotional response to something new. Thus, if companies could know before hand which of the three character dispositions (or combination thereof) a certain potential consumer has, then the company could give a customized advertisement to that consumer according to his or her character disposition. When marketing to potential consumers with a particular character disposition, the company could stress advantages of the product (or service) that would appeal especially to that potential consumer. Companies can also adapt the visual, sensory, and/or audio qualities of an advertisement to help ensure a positive initial response to the advertisement.

As mentioned before, one character disposition according to various embodiments of the present invention is the "survival orientation". In this regard, if an individual is survival-oriented, then he or she is primarily concerned with filling the most basic of physical, emotional, and social needs. Survival-oriented individuals have a tendency to feel that the world is not a safe place and they worry mostly about their personal survival. Such an individual defines a certain threshold of basic needs that are necessary for survival. Survival-oriented individuals typically feel that life is hard and they treat every minor problem as a potential threat to survival. They view new objects in terms of the potential threat or the ability for the object to distance them from the threshold. Such an individual is attracted to advertisements that appeal to their strong survival instinct.

Another character disposition according to various embodiments of the present invention is the "growth orientation". In this regard, growth-oriented individuals typically seek out new ways to improve their economic opportunities, their spiritual side, their relationships, health, etc. Such individuals typically want to advance further than where they are. They seek challenge and novelty and it is difficult for them to settle into a particular routine. Progress is desirable while regress or "status-quo" are viewed as damaging. A growth-oriented person is typically interested in art and culture. Such an individual is attracted to advertisements that appeal to their innate desire to grow (e.g., advertisements containing bright colors such as red (bright colors evoke the sense of risk and adventure) or verbal messages relating to the novelty and innovation of the product or service). Their initial emotional response to such advertisements would be a positive one.

Another character disposition according to various embodiments of the present invention is the "relaxation orientation" (also sometimes referred to herein as the "homeostasis orientation"). In this regard, relaxation-oriented individuals are averse to change, and therefore hesitate to take risks (even if the risks have a high probability of success) and to try new things. They believe that any change is damaging and typically try to maintain things at the level that they are at currently. Relaxation-oriented individuals tend to feel most comfortable at home and they view family life as being more important than career. They are attracted to advertisements that appeal to their strong inclination towards relaxation and homeostasis (for example, if the advertisement contained "relaxing" colors (such as blues or greens), if the advertisement had relaxing music playing in the background, or if the advertisement pictured a very relaxing scene, then a relaxation-oriented individual would typically have a positive initial emotional response, and be prompted to investigate more into the product or service being advertised).

Further, under various embodiments of the present invention, it is possible to predict whether an individual is basically oriented towards the survival, growth, or relaxation disposition. In one example, the prediction may be done through responses to a questionnaire (e.g., received over the World Wide Web, e-mail, telephone, interactive television, at a point-of-sale or any other appropriate interactive medium). The questionnaire may contain, for example, questions concerning vacation preferences, responses in hypothetical situations, and even favorite colors. All these can be indicative of whether the potential consumer is chiefly oriented towards survival, growth, or relaxation. Information collected from the potential consumers (from the questionnaires and/or other sources) may be input into a database and each potential consumer may be given a character profile and grouped into as cluster, according to the orientation manifested in the character profile. The questionnaire may be responded to as part of a larger series of questions not related to the marketing campaign (such as a telephone survey), or it may be an independent undertaking of the company doing the marketing. In another example, the predication may done through checking which Internet sites an individual frequents, spending patterns, etc. In another example, the prediction may be carried out using any combination of the above.

A company may develop a series of advertisements for one product (or service), each advertisement in the series being geared towards a specific orientation (e.g., survival, growth, or relaxation) by varying the words, colors, smells, sounds, etc. utilized in each advertisement. Thus, each advertisement may be adapted to be effective for a particular disposition so as to create a maximum positive emotional response from the potential consumer and thus increase the chances of a sale. For example, when marketing a new, homeopathic medicine, a company can stress those soothing, tension-reducing aspects of the drug (if any) when the marketing is directed towards a relaxation-oriented person. Additionally, relaxing music and/or scenery may be provided during the advertisement. Alternatively, if an advertisement is directed towards a survival-oriented person, the company may stress any life-prolonging, disease-preventing aspects of the drug. For example, if the medicine enhances immune system function, the company could stress that the "medication raises efficiency of the body's natural defenses." Needless to say, there are many possibilities for customized marketing according to this model.

The advertisements may be presented to the potential consumer through any appropriate medium, such as e-mail, telephone (CRM and cellular), interactive television, and point-of-sale. Since the advent of various interactive mediums can sometimes allow a company to know the location of the potential consumer, it is further possible to present those advertisements that will appeal to the potential consumer in the exact situation that he or she is in. For example, a relaxation-oriented individual on vacation can be presented (e.g., through cellular phone) with advertisements for relaxing activities that he or she can pursue while on vacation at the particular spot. An individual may also be presented with customized advertisements at a point-of-sale, since entering one's credit card information can typically enable a company to identify the customer, and the cluster to which they belong, and thereby present to them suitable advertisements.

Of note, while various embodiments of the present invention have been described in connection with producing effective marketing, the present invention may, of course, also be used in other fields (e.g., matchmaking services, finding an appropriate "chat" partner in an on-line chat-room, or for employment matching). In each field of application, users or applicants may be grouped according to the supplied answers, into different clusters corresponding to similar character orientations. Thereafter, a "match" may be made by pairing up one individual (or employer) with another individual (or employer) having the desired orientation.

As described above, it is believed that many decisions that people make are the result of a spontaneous and an instinctive thought process (people are typically either incapable or unwilling to invest the time that would be needed for a thorough analysis of all the factors involved in a complex decision). Indeed, very often a rapid decision is necessary for the sake of sorting out the very same information that is required for the decision. At other times, the need for a rapid response necessitates a quick decision before the completion of a lengthy cognitive analysis. As a consequence, humans are conditioned for rapid, instinctive decisions. While these quick decisions are often subsequently reinforced by slower cognitive processes, the initial, instinctive bias typically does not change and will carry a significant weight in any further deliberations.

In light of the above, there is considerable interest in identifying and describing those elements and processes that are involved in instinctive decision-making. Elucidating the instinctive decision-making process according to the present invention is of use and relevance in the following examples (which are intended to be illustrative and not restrictive):

A. Understanding a person as an individual faced with constant choices whereby an identification of that person's tendencies would suggest who and what he or she would approve of.

B. Understanding a person as an individual faced with purchasing decisions (e.g., goods and/or services) whereby knowledge of that person's decision-making process would allow someone to guide or influence the potential consumer's choice (e.g., by a proper matching of goods and/or services).

C. Understanding an individual's decision-making tendencies to allow an observer to predict how that individual will fit within an organization. This would be useful, for example, in the context of job recruitment, job placement, team-building and/or tailored job-training.

D. Understanding a person and predicting his or her reactions (e.g., for the purpose of evaluating a potential security risk).

Presented above was a model for instinctive decision-making that uses a three-dimensional personality profile. The three dimensions are the result of three drives:

1. Survival (S)—the willingness of an individual to fight for his or her own survival and his or her readiness to look out for existential threats.
2. Homeostasis (H) [or "Relaxation"]—the extent to which an individual would prefer to maintain his or her 'status quo' in all areas of life (from unwavering opinions to physical surroundings) and to maintain his or her way of life and activity.
3. Growth (G)—the extent to which a person strives for personal growth in all areas (e.g., spiritual, financial, health, etc.).

It is believed that these three drives have a biochemical basis in the brain by the activity of three neurotransmitter loops:

1. Survival—could be driven by the secretion of adrenaline and noradrenalin,
2. Homeostasis—could be driven by the secretion of acetylcholine and serotonin,
3. Growth—could be driven by the secretion of dopamine.

While all human beings share these three instinctive drives (S,H,G), people differ in the relative strengths of the individual drives. For example, a person with a very strong (S) drive will demonstrate aggressiveness, possessiveness and a tendency to engage in high-risk behavior when he or she is unlikely to be caught. On the other hand, an individual with a weak (S) drive will tend to be indecisive and will avoid making decisions. A person with a strong (H) drive will tend to be stubborn and resistant to changing opinions and/or habits. In contrast, an individual with a weak (H) drive will frequently change his or her opinions and/or habits. Or, for example, an individual with a strong (G) drive will strive to learn new subjects and will strive for personal enrichment (intellectual and otherwise). A weak (G) drive, on the other hand, may lead a person to seek isolation and may even result in mental depression.

This (S,H,G) system was described above and a mechanism for measuring an individual's profile through the use of a questionnaire was presented (whereby an (S,H,G) profile is derived on the basis of answers to a questionnaire). Furthermore, a method for improving marketing efforts on the basis of a questionnaire-derived (S,H,G) profile was presented. Of course, when using a questionnaire a tested subject must consent and cooperate fully with a tester.

In this regard, various embodiments directed to a system and method for determining a personal SHG profile by voice analysis will now be presented.

Reference will now be made to what is referred to herein as the "average intensity function". This average intensity function may be computed by measuring the intensity of the speaker's voice during the time period "T" (in one example, T may be a relatively short span of a few dozen seconds). The average voice intensity is measured by measuring the intensities of sound at each different frequency (for example, in the frequency range of between 20 Hz and 15000 Hz) during multiple time-points within the range T. The time-points (T1) may be selected to be equally distributed during the total range T. At each time-point, the intensity of each frequency is measured and is described as a function "F1" of that frequency I(F1,T1). This measurement is repeated at every time-point for a total of "N" measurements to span the entire range T. Thus, in this example, the average intensity function for each frequency can be described as:

$$I(f0) = 1/n \sum_{i=1}^{n} I(f0, T_1)$$

Reference will now be made to what is referred to herein as the "maximum intensity function". In this regard, essentially the same voice intensity measurements that were described for the average intensity function may be collected. Further, the maximum intensity function will be arrived at (during the time T) by the equation:

$$I\,MAX(f0) = MAX\,[I(f0,T)]$$

As described herein, the present invention relates to a system and method to determine an individual's (S,H,G) profile by an analysis of the characteristics that make up an individual's voice.

Referring now to FIG. 1, it is seen that according to one embodiment of the present invention a computerized voice-analysis device for determining an S,H,G profile is provided (as described above, such an S,H,G profile relates to the strengths (e.g., relative strengths) of three human instinctive drives). Of note, the present invention may be used for one or more of the following: analyzing a previously recorded voice sample; real-time analysis of voice as it is being spoken; combination voice analysis—that is, a combination of: (a) previously recorded and/or real-time voice; and (b) answers to a questionnaire.

Still referring to FIG. 1, it is seen that the device of this embodiment is based on a recorder 101 that records a voice sample (e.g., of at least a few seconds). The analysis is then based on a three-dimensional measurement: 1) the relative magnitude of the speaker's voice, 2) in different frequencies and 3) over time. For example, the device could measure the relative magnitude of a speaker's voice, in the frequency range of 60-22,000 Hz, every one-tenth of a second. This analysis may be carried out in voice processing software 103. The data collected, as described above, is then translated into the following mathematical functions: (1) Relative intensity, as a function of time, in every given frequency; (2) The maximum intensity, as a function of the frequency that was recorded within the tested time period; (3) The average intensity (during the testing period) as a function of the frequency. This analysis may be carried out in intensity-determining software 105. Finally, SHG-determining software 107 may be utilized to generate an (S,H,G) profile (of note, CPU 109 may be utilized to run voice processing software 103, intensity-determining software 105 and/or SHG-determining software 107 (each of which may be stand-alone or integrated with one or more of the others).

Of note, digitization of the analog speech may be carried out by a microphone, by the voice recorder and/or by the computer (CPU and/or software). Further, while in one example the software of the device shown in FIG. 1 may operate in the MICROSOFT WINDOWS environment, any other software environment may be utilized (e.g., UNIX, LINUX, the MAC operating system, etc.).

As described above, various embodiments of the present invention thus provide a scientific method not only for the decoding of behavior but for the mapping of preconscious motivation.

Reference will now be made to the following example system and method for voice analysis (wherein this example provides additional detail regarding the system configuration and calculation/analysis methods and is, of course, intended to be illustrative and not restrictive):

1. General Considerations
   1.1 The voice-analysis device of this example operates in real-time (although non-real-time configurations are contemplated) and allows characterization of a speaker after about 10-20 seconds of speech (provided, for example, that the speaker spoke for at least 20 seconds and the total time of continuous sound totals at least 10 seconds).
      For the purpose of analysis, the device of this example is able to distinguish and differentiate, on the basis of voice, between an interviewer and an interviewee (i.e., the voice to be analyzed).
   1.2 The device of this example is adapted to analyze a voice during, for example, a phone-carried conversation (in another example the device is able to analyze pre-recorded sounds off-line). Further, the device of this example is able to process voice recordings from any of the widely-used voice-recording systems currently in use.
   1.3 The device may be adjusted, by the input of data, for analyzing a male or female voice.
   1.4 The device's output under this example includes:
      First Stage
      Numerical values for the three instinctive drives: H, S and G
      The numerical values assigned to each instinctive drive may range, in this example, from 1 to 6 and may be displayed on a computer screen as a result of the analysis. These numerical values may also (or instead) be stored in a database and linked to factual details about the speaker, the interviewer, the date and time of the interview and/or the purpose of the interview/analysis.
      Second Stage
      Based on the numerical values that were assigned to the speaker, the interviewer may be presented with a personality-profile description of the speaker and/or "tips" for an effective conversation with the speaker (these may be output to a computer screen and/or printer)
      Third Stage
      The "tips" supplied may be highly specific and relevant to the conversation being carried out. For example, if the interviewer is a salesperson, the device may suggest specific products to be offered and the ideal method of presentation.
2. The basic measurements and calculations
   2.1 The device of this example measures sound intensities, for each frequency, during a series of time-points (e.g., at a spacing of no more than 0.05 seconds).
   2.2 The sound frequencies measured may be spaced, for example, at 20 Hz intervals.
   2.3 The device of this example does not measure absolute intensity levels but it measures sound intensities on a relative scale for each analyzed voice.
   2.4 The device of this example calculates average intensity and maximum intensity values, for each frequency, during, e.g., consecutive 2.5 second segments. After arriving at such values for (under this example) six segments (a total of 15 seconds) the device proceeds to calculate numerical values for each instinctive drive G, H and S.
3. Calculating numerical S, H, G values
   G, H, S calculations under this example may be carried out as follows:
   For every time segment
      A cumulative value (adding together the scores from each of the various below-identified aspects for each of the time segments) until a final value is achieved (e.g., over the course of six time segments).
      It is important to deduct "background noise" from sound intensity values.
   3.1. Calculating "G" value:
      A. W
         The frequency range, within the lower frequencies (e.g., for men: 100-900 Hz; for women: 200-1000 Hz) during which the actual average intensity is higher than 10% of highest average intensity value within these lower frequencies. The numerical value for G for this aspect is computed as follows:
         4 points if the above-defined range is greater than 300 Hz wide
         2 points if the above-defined range is 250-300 Hz wide
         1 point if the above-defined range is 180-249 Hz wide
         0 points if the above-defined range is less than 180 Hz wide
      B. P(X) Maximum Of Average Intensity
         The device of this example compares the maximum of the average intensity values for the following frequencies 300 Hz, 400 Hz, 500 Hz, 600 Hz, 700 Hz, 800 Hz, 900 Hz, 1000 Hz (or a nearby frequency, if one of these frequencies was not calculated). The numerical value for G for this aspect is computed as follows:
         5 points if the maximum of the average intensity values is at 300 or 400 Hz
         4 points if the maximum of the average intensity values is at 500 Hz
         3 points if the maximum of the average intensity values is at 600 Hz
         1 point if the maximum of the average intensity values is at 700 or 800 Hz.
      C. A high G-value personality will rotate intensities, as a function of time, between the two frequencies 400 and 600 Hz. When the intensity of 400 Hz goes up, intensity of 600 Hz goes down. A midrange and low G personality will have less of a connection between these two frequencies. A low G-value personality will display a relatively constant intensity at 400 Hz even as the intensity of the 600 Hz frequency fluctuates with time. This phenomenon can be measured by comparing the derivative of the 400 Hz intensity curve to the derivative of the 600 Hz derivative curve, as a function of time. The numerical value for G for this aspect is computed as follows:
         4 points if there is a strong display of this phenomenon (i.e., it is happening throughout the sampled timeframe and with high intensity).
         2 points if there is a medium strength display (i.e. only part of the time strong or constant, but with low intensity).
         1 point if there is a weak display of this phenomenon (i.e., it is happening only for short periods of time and at a low intensity).
      D. The density of high intensity peaks at 400 and 600 Hz, as a function of time, indicate the strength of G. The numerical value for G for this aspect is computed as follows:
         4 points if there are 4 intensity peaks (2 of 400 Hz and 2 of 600 Hz) within 15 seconds.
         2 points if there are only 3 intensity peaks within 15 seconds.
      E. The intensity at 40 Hz, 100 Hz (for men) and 200 Hz (for women) is compared to that of 300 Hz or 400 Hz.

The numerical value for G for this aspect is computed as follows:

(For telephone-recorded sound bites)

4 points if the intensity of one of these frequencies (40, 100 or 200) is at least 25% of the intensity at 300 Hz or 400 Hz.

2 points if the intensity of one of these frequencies (40, 100 or 200) is 16%-24% of the intensity at 300 Hz or 400 Hz.

1 point if the intensity of one of these frequencies (40, 100 or 200) is 10%-15% of the intensity at 300 Hz or 400 Hz.

(For non-phone recordings):

4 points will be assigned if the intensity at 40 Hz is at least 2.5× the intensity of 300 Hz.

2 points will be assigned if the intensity at 40 Hz is at least 1.5× the intensity of 300 Hz.

1 point will be assigned if the intensity at 40 Hz is the same as the intensity of 300 Hz.

Conclusion

The total number of points earned over six, 2.5 second segments will vary in this example between 0 and 126 points. The speaker's G level is based on the point score, using the following guidelines:

Grading of G level (6 level grading):
Level 6—Very high G: 85-126 points
Level 5—High G: 56-84 points
Level 4—Medium G: 35-55 points
Level 3—Medium-low G: 20-34 points
Level 2—Low G: 9-19 points
Level 1—Very Low G: 0-8 points.

Grading of G level (3 level grading):
High Level G: 56-126 points
Medium Level G: 20-55 points
Low Level G: 0-19 points.

3.2. Calculating Numerical Value for "H":

A. A high H personality will communicate with a relatively stable voice intensity at the lower sound frequencies; e.g., intensity at 300-600 Hz will not fluctuate much. This effect can be quantified by measuring the distance between the maximum intensity and the average intensity for each of these frequencies. Two numbers will be used for this determination: "AVG(!I)" and "L". "AVG(!I)" is the average difference in intensity between the average function and the maximum function in the range of 300-600 Hz. The value "L" is defined as "the average maximum distance between the two functions (the average function and the maximum function)." The value of "L" is determined by: 1) finding the two frequencies ($\Phi_1$, $\Phi_2$) where the difference between the intensities (I) of the two functions (maximum and average) is greatest, 2) measuring the difference in intensity at these two frequencies ($!I\Phi_1$, $!I\Phi_2$), and 3) taking the simple average of these two numbers $L=(!I\Phi_1+!I\Phi_2)/2$. The numerical value for H for this aspect is computed as follows:

4 points if: $L \geq 0.75*(AVG(!I))$
2 points if: $0.5*(AVG(!I)) < L < 0.75*(AVG(!I))$
1 point if: $0.25*(AVG(!I)) < L < 0.5*(AVG(!I))$ B. A very low H value is correlated with a high number of intensity peaks in the average function graph. The numerical value (NP) for H determination for this aspect is scored by the number of such peaks in a 1000 Hz range:
6 points for 6 (or more) peaks
4 points for 4-5 peaks
2 points for 3 peaks
1 point for 2 peaks
0 points for 1 peak C. A very low H value is also correlated with a high number of peaks in the maximum function graph. Here, the numerical value (NMP) for H determination will be determined for this aspect by the number of peaks within the frequency range of 300-1000 Hz:
6 points if there are 11 (or more) peaks
4 points if there are 9-11 peaks
2 points if there are 7-9 peaks
1 point if there are 3-6 peaks
0 points if there are 1-2 peaks.

D. A very low H value is also correlated with a high number of peaks in the maximum function graph in the range of 1000-3000 Hz. The numerical value (NMP2) for H determination will be determined for this aspect by the number of peaks within the stated range:
6 points if there are 15 (or more) peaks
4 points if there are 9-14 peaks
2 points if there are 4-8 peaks
1 point if there are 2-3 peaks
0 points if there is 1 peak.

E. A high H value correlates with a relatively long break between the appearances of lower frequencies in measurable intensities. To give a specific example (which example is intended to be illustrative and not restrictive), a long break is a time period of 1.5 seconds (or longer) while a very short break would be one of only 0.3 seconds. This time break (AT) is measured for the frequencies 300, 400, 500 and 600 Hz. The assigned score for determining H for this aspect will be as follows:
0 points for an AT of 1.5 seconds (or longer),
1 point for an AT of 1-1.5 seconds,
2 points for an AT of 0.75-1.0 seconds,
4 points for an AT of 0.5-0.75 seconds,
6 points for an AT of less than 0.5 seconds Conclusion For each segment the score will range from 0 to 28 points. And for the six segments together, a maximum score under this example will be 168.

Grading of H level (6 level grading):

| | |
|---|---|
| Level 1 - Very Low H | 112-168 points. |
| Level 2 - Low H | 74-111 points |
| Level 3 - Low-Medium H | 45-73 points |
| Level 4 - High-Medium H | 26-44 points |
| Level 5 - High H | 12-25 points |
| Level 6 - Very High H | 0-11 points. |

Grading of H level (3 level grading):

| | |
|---|---|
| Low H Level | 74-168 points |
| Medium H Level | 26-73 points |
| High H Level | 0-25 points. |

3.3. Calculating Numerical Value for "S":

A. After a short adjustment period, an individual with a high S value will display sharp changes in intensity at 600 and 800 Hz. To allow for the adjustment period, this change in intensity should be measured only after the first three 2.5 second segments have already elapsed. A high S individual will exhibit a 50% drop in intensity, within a 0.1 second period, followed by a return to 100% intensity within 0.2 seconds. For the calculation of this aspect, the derivative functions for the intensities at 600 and 800 Hz are evaluated and the percentage of derivatives that exhibited a rapid change (as described above ±25%) is the determinant for the S score:

6 points if more than half of the derivatives exhibited rapid change, 4 points if one-third to one-half of derivatives exhibited rapid change 2 points if one-third, or less, of derivatives exhibited the rapid change.

B. For this aspect, where P=Average Intensity, the score for S will be:

6 points are assigned if: $P(800\ Hz) + \frac{1}{4} P(600\ Hz) > P(400\ Hz)$ 4 points are assigned if: $\frac{3}{4} P(400\ Hz) < P(800\ Hz) + \frac{1}{4} P(600\ Hz) < P(400\ Hz)$ 2 points are assigned if: $\frac{1}{2} P(100\ Hz) < P(800\ Hz) + \frac{1}{4} P(600\ Hz) < \frac{3}{4} P(400\ Hz)$ 0 points for all others.

C. A high number of peaks, in the Maximum Intensity function, within the range of 1000 to 3400 Hz, is indicative of a high S value. The score for S for this aspect is assigned as follows:

6 points are assigned if there are 20 (or more) peaks, 4 points are assigned if there are 10-20 peaks, 2 points are assigned if there are 5-9 peaks, 1 point is assigned if there are 2-4 peaks, 0 points are assigned if there are less than 2 peaks.

D. For this aspect, where there is a significant rise in maximum intensity at 3000 (±300) Hz with at least one peak, the score for S is assigned as follows:

6 points are assigned if the rise in intensity is 4-fold (or more), 4 points are assigned if the rise in intensity is 2 to 3-fold, 2 points are assigned if the rise in intensity is only 50%, 1 point is assigned if the rise in intensity is less than 50%, 0 points are assigned if there is no rise in intensity.

Conclusion

For the six segments together the score could range from 0 to 144.

Grading of S level (6 level grading):

Level 6—Very high S: 105-144 points

Level 5—High S: 76-104 points

Level 4—Medium S: 51-75 points

Level 3—Medium-low S: 26-50 points

Level 2—Low S: 11-25 points

Level 1—Very Low S: 0-10 points.

Grading of S level (3 level grading):

High Level S: 56-144 points

Medium Level S: 20-55 points

Low Level S: 0-19 points.

4. Personality Profiles

In this example, there is an option for using one of three systems for combining the individual G, S and H scores and defining a personality profile:

Combination A:

The personality types are defined by the combinations of three-level G, H and S scores that were determined as described above.

3 $G$ levels×3 $H$ levels×3 $S$ levels=27 possible combinations.

Combination B:

The personality types are defined by the combinations of six-level G, H and S scores that were determined as described above.

6 $G$ levels×6 $H$ levels×6 $S$ levels=216 possible combinations.

Combination C:

The personality types are defined by the two drives with the highest scores. This method will have six possible combinations: GH, GS, HG, HS, SG, SH.

Reference will now be made to two example questionnaires that may be utilized (alone or together) to supplement or be used in combination or conjunction with voice analysis to determine an individual's S,H,G profile. More particularly, the two example questionnaires are as follows:

1. First Example Questionnaire a. Instructions: A few sentences will be read to you. For each sentence, rate the truthfulness of the statement with respect to yourself. The rating is done by assigning a number, from 1 to 6, using the following scale: (6—totally true, 1—totally not true):

1. A wonderful day is a day without any unexpected events.
2. A wonderful day is an eventful & out of the ordinary day.
3. I will never quit learning.
4. Learning is needed during the first 30 years of life. After that, one should spend time working & enjoying.
5. I derive my main satisfaction from my success in overcoming difficulties.
6. My main satisfaction is from my constant growth and development emotionally & intellectually.
7. My main satisfaction is from the few hours of rest & relaxation that I get.
8. I long to retire early on so that I can live quietly.
9. I have to work—otherwise I have no way of making a living.
10. I will never stop working because my interest in people & work are a major part of my life.
11. I'm always amongst the first to purchase new products.
12. I'm always willing to try new products, even if none of my acquaintances tried them.
13. An ideal life partner is someone who puts me at ease.
14. An ideal partner is someone who, to a large extent, contributes to my emotional & cognitive development.
15. There is no need to reinvent the wheel. All, or most of all, is known already.
16. I don't tend to change my mind since I already know what is right, what is wrong, how to live and how not to live.

2. Second Example Questionnaire a. Instructions: A few sentences will be read to you. For each sentence, rate the truthfulness of the statement with respect to yourself. The rating is done by assigning a number, from 1 to 6, using the following scale: (6—totally true, 1—totally not true):

1. I prefer developing at one work-place over the years.
2. I try not to work more than 8 hours a day.
3. A great day is one without any extraordinary events.
4. I detest changes & novelties. They frighten me.
5. The rush to change fashion trends is grotesque! There is nothing wrong with what I have been wearing these past 5-10 years.
6. I await my retirement! Finally, I will be able to stop this crazy life tempo.
7. There are many people who want to hurt me.
8. I could have progressed more in life, but there are a few people who dislike me.
9. Life is a struggle.
10. Life is like a fortune wheel; the results have nothing to do with our input.
11. If I could receive $5,000 a month from someone, I'd stop working altogether.
12. I'm suspicious of new people & it takes me a while to get acquainted & deal with them.
13. I'm always willing to try new products, even if none of my acquaintances tried them.
14. I prefer a partner with whom my life would be adventurous & spicey rather than someone who dislikes changes & prefers a peaceful & quiet life.
15. I will never stop working since my interest in people & work are a major factor in my life.
16. I try to learn a new thing each & every day.
17. I try to keep up to date, professionally, by reading books & taking courses.
18. Independence is important to me in my work. This way I can develop my own original ideas.

In another example, a questionnaire-based approach may be compared to a voice-analysis approach to identify and define voice characteristics that can be used to determine a speaker's (S), (H) and (G) levels. In other examples, an (S,H, G) profile, determined by voice analysis, may be utilized to provide:

a) an accurate prediction of an (S,H,G) profile, as determined by a questionnaire,
b) a prediction of a subject's behavior that matched predictions that were based on other personality assessment tests,
c) a tool for more effective marketing (the improved efficiency here was even greater than was previously achieved by the use of a questionnaire).

As shown above, various embodiments of the present invention may provide a mechanism for identifying and predicting patterns of human behavior (applications according to the present invention have utility in the fields, for example, of personal management and in directed sales or marketing).

Of note, the present invention may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, while three-level and six-level grading have been described, the invention may utilize any other number of grading levels. Further, while the use of six time segments has been described, any other desired number of time segments may be utilized (e.g., at least 4 time segments of 2.5 second each for a total time of 10 seconds). Further still, one or more questionnaires may supplement or be used in combination or conjunction with one or more voice analyses. Further still, one or more questionnaires may validate one or more voice analyses. Further still, one or more voice analyses may supplement or be used in combination or conjunction with one or more questionnaires. Further still, one or more voice analyses may validate one or more questionnaires. Further still, the present invention may be used for personalized advertising, personalized marketing, personalized sales, insurance company use, police department use, and/or dating service use (e.g., Internet dating). Further still, the present invention may be applied in-person or remotely (e.g. via telephone, radio, television). Further still, the present invention may be applied to determine what to say to an individual (e.g., to make a sale) as well as when to say something to an individual (e.g., to make a sale). Further still, the voice signal may be input (for processing herein) via a microphone, a telephone or any other device. Further still, voice may be stored in any desired format (e.g., in the MPEG format). Further still, one or more databases (e.g., containing voice analysis information) may be utilized. Further still, various functions of software described herein may be carried out in one or more software programs, in firmware and/or in hardware (e.g., dedicated hardware). Further still, one or more steps may be automated. Further still, any steps may be performed in any desired order (and any desired steps may be added and/or deleted).

What is claimed is:
1. A method for analyzing a voice of a speaker, comprising:
receiving, by a computer, data indicative of speech from the speaker;
storing, by a computer, the received data in at least one database;
calculating, by a computer, based upon the received data, an average intensity value for each of a plurality of frequencies, wherein the calculation of the average intensity value for each frequency is based on:
i) dividing, by a computer, the received data into a number of time periods;
ii) obtaining, by a computer, an intensity of the speaker's speech for each frequency during each time period;
iii) obtaining, by a computer, a sum of intensity values for each frequency during all time periods; and
iv) dividing, by a computer, the sum of intensity values for each frequency by the number of time periods;
calculating, by a computer, based upon the received data, a maximum intensity value for each of the plurality of frequencies, wherein the maximum intensity value for each frequency is the highest intensity of the speaker's speech for each frequency during all time periods;
calculating, by a computer, a level of a survival element of a personality profile of the speaker based upon at least one of: (a) a rapid change in the average intensity value between at least a portion of the plurality of frequencies; and (b) a rapid change in the maximum intensity value between at least a portion of the plurality of frequencies;
calculating, by a computer, a level of a homeostasis element of the personality profile of the speaker by measuring a distance between the average intensity value and the maximum intensity for each frequency of at least a portion of the plurality of frequencies;

calculating, by a computer, a level of a growth element of the personality profile of the speaker based upon at least one of:
(a) determining, by a computer, a frequency range within at least a portion of the plurality of frequencies in which the average intensity value of each frequency within the frequency range is higher than a value that is equal to a predetermined percent of the highest average intensity value within the frequency range of the at least a portion of the plurality of frequencies,
(b) determining, by a computer, at least one frequency within at least a portion of the plurality of frequencies that has the highest maximum intensity value among the at least a portion of the plurality of frequencies, and
(c) determining, by a computer, a level of correlation between changes in intensity values during the time periods of a first frequency and changes in intensity values during the time periods of a second frequency; and outputting, by a computer, an indicator of the personality profile of the speaker based upon a combination of the calculated level of the survival element of the speaker, the calculated level of the homeostasis element of the speaker, and the calculated level of the growth element of the speaker.

2. The method of claim 1, wherein the calculated level of the survival element comprises one of three possible levels, wherein the calculated level of the homeostasis element comprises one of three possible levels, wherein the calculated level of the growth element comprises one of three possible levels, and wherein the indicator of the personality profile comprises one of twenty-seven possible combinations of the levels of the survival element, the homeostasis element and the growth element.

3. The method of claim 1, wherein the calculated level of the survival element comprises one of six possible levels, wherein the calculated level of the homeostasis element comprises one of six possible levels, wherein the calculated level of the growth element comprises one of six possible levels, and wherein the indicator of the personality profile comprises one of two-hundred and sixteen possible combinations of the levels of the survival element, the homeostasis element and the growth element.

4. The method of claim 1, wherein the indicator of the personality profile comprises one of six possible combinations of the two highest levels selected from the group consisting of the calculated level of the survival element, the calculated level of the homeostasis element, and the calculated level of the growth element.

5. The method of claim 1, wherein the data indicative of speech from the speaker is received in real-time, as the speaker is speaking 6. The method of claim 1, wherein the data indicative of speech from the speaker is received from a recording of previously spoken speech.

7. The method of claim 1, wherein the data indicative of speech from the speaker is received via a telephone.

8. The method of claim 1, wherein the output indicator of the personality profile of the speaker is compared to results of a questionnaire.

9. The method of claim 8, wherein the output indicator of the personality profile of the speaker is compared to the results of the questionnaire to validate the results of the questionnaire.

10. The method of claim 8, wherein the output indicator of the personality profile of the speaker is compared to the results of the questionnaire to supplement the results of the questionnaire.

11. The method of claim 8, wherein the output indicator of the personality profile of the speaker is compared to the results of the questionnaire to validate the results of the voice analysis.

12. The method of claim 8, wherein the output indicator of the personality profile of the speaker is compared to the results of the questionnaire to supplement the results of the voice analysis.

13. The method of claim 1, wherein each of the time periods is essentially the same.

14. The method of claim 1, wherein each of the time periods is essentially the same.

15. The method of claim 1, wherein each of the time periods is essentially the same.

16. The method of claim 1, wherein the output indicator of the personality profile is utilized in at least one of: (a) personalized advertising; (b) personalized marketing; (c) personalized sales; (d) insurance company use; (e) police department use; and (f) dating service use.

17. The method of claim 16, wherein the output indicator of the personality profile is utilized to help determine what to say to the speaker.

18. The method of claim 16, wherein the output indicator of the personality profile is utilized to help determine when to say something to the speaker.

19. The method of claim 1, wherein each of the steps is carried out using at least one of computer hardware and computer software.

20. The method of claim 1, wherein each of the steps is carried out in the order recited.

21. The method of claim 1, wherein the output indicator of the personality profile of a first person is utilized to help determine whether the first person and a second person are compatible with one another as a couple.

22. The method of claim 21, wherein the output indicator of the personality profile of the first person and an output indicator of the personality profile of the second person are utilized to help determine whether the first person and a second person are compatible with one another as a couple.

23. The method of claim 1, wherein the output indicator of the personality profile of a first person is utilized to help determine whether the first person and a second person are compatible with one another as co-workers.

24. The method of claim 23, wherein the output indicator of the personality profile of the first person and an output indicator of the personality profile of the second person are utilized to help determine whether the first person and a second person are compatible with one another as co-workers.

25. The method of claim 1, wherein the indicator of the personality profile of the speaker is associated with at least one personality profile from a plurality of personal profiles which are calculated, by a computer, based on all possible mathematical permutations among levels of grading for at least two of:
a) the survival element,
b) the homeostasis element, and
c) the growth element.

* * * * *